United States Patent [19]
Dwyer

[11] Patent Number: 5,678,790

[45] Date of Patent: Oct. 21, 1997

[54] UTENSIL REST

[76] Inventor: Robert R. Dwyer, 7163 Via De Amigos, Scottsdale, Ariz. 85258

[21] Appl. No.: 518,159

[22] Filed: Aug. 23, 1995

[51] Int. Cl.$^6$ ................................................. A47G 21/14
[52] U.S. Cl. .................. 248/37.6; 211/70.7; 248/37.3; 248/213.2
[58] Field of Search ............................. 248/37.3, 37.6, 248/213.2, 220.21, 222.11, 222.12, 231.81, 316.7; 211/70.7; D7/637, 393, 395

[56] References Cited

U.S. PATENT DOCUMENTS

| | | |
|---|---|---|
| 1,182,732 | 5/1916 | Avery . |
| 1,196,543 | 8/1916 | Hauf, Jr. . |
| 1,305,777 | 6/1919 | Cunningham . |
| 1,323,924 | 12/1919 | Stevens . |
| 1,327,982 | 1/1920 | Burns . |
| 1,464,731 | 8/1923 | Smith . |
| 1,472,995 | 11/1923 | Simone ........................... 248/37.6 |
| 2,243,554 | 5/1941 | Epstein ........................... 248/316.7 X |
| 2,298,901 | 10/1942 | Pickering . |
| 2,371,537 | 3/1945 | Mangini . |
| 2,483,724 | 10/1949 | Butler ............................. 248/37.3 |
| 2,713,469 | 7/1955 | Wright ........................... 248/316.7 X |
| 4,632,347 | 12/1986 | Jurgich . |
| 4,911,310 | 3/1990 | Raishe et al. .................. 211/87 |
| 4,991,803 | 2/1991 | Buder . |
| 5,105,963 | 4/1992 | Scott . |
| 5,462,348 | 10/1995 | Ellingson et al. ............. 312/301 |

FOREIGN PATENT DOCUMENTS

| | | | |
|---|---|---|---|
| 348254 | 4/1905 | France ........................... | 248/37.3 |
| 540308 | 10/1941 | United Kingdom ............ | 248/37.6 |

*Primary Examiner*—Ramon O. Ramirez
*Assistant Examiner*—Anita M. King
*Attorney, Agent, or Firm*—Donald J. Lisa

[57] ABSTRACT

A utensil rest has an upwardly extending cradle for holding a utensil by gravity, an elongated vertical rib supporting the cradle and having one end taller than the other end, and a spring clip depending from the short end of the rib having a pair of spaced, inturned prongs with outturned ends. The prongs easily snap onto and grasp the handle of a receptacle or cooking vessel mounting the rest thereon, positioning the tall end of the rib near the vessel rim and fulcruming the bottom of the tall end against the top surface of the handle for holding the working end of the utensil generally horizontally over the open vessel. In one mode, a transverse ridge at the inboard end of the cradle vertically supports the inboard end of the utensil. The rest is molded integrally of nylon.

18 Claims, 4 Drawing Sheets

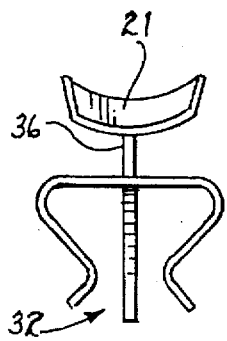 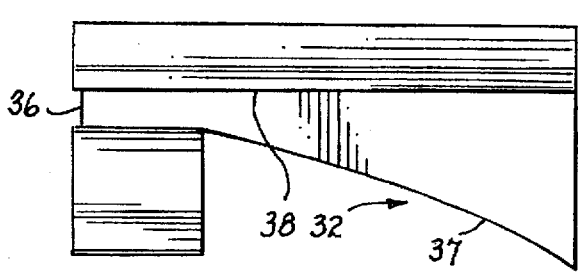 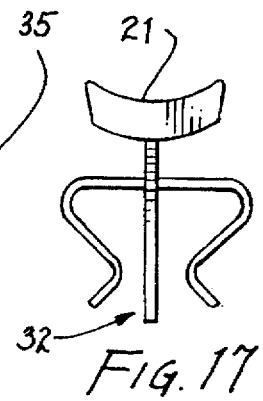
FIG. 16   FIG. 15   FIG. 17
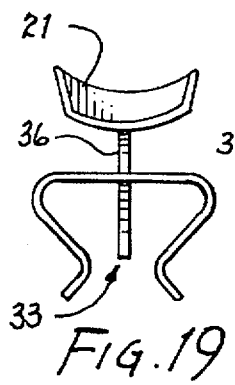 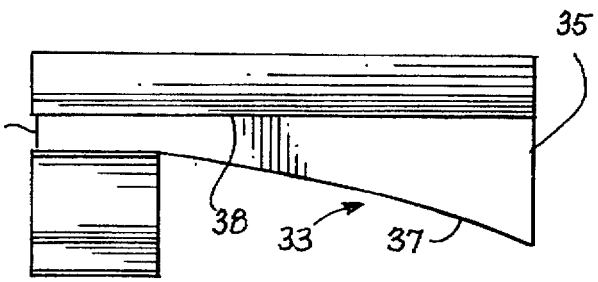 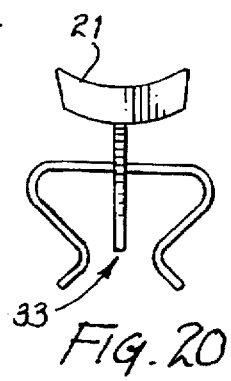
FIG. 19   FIG. 18   FIG. 20
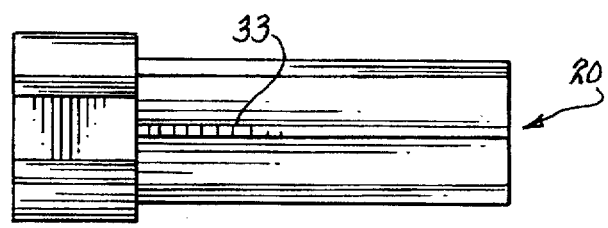
FIG. 21

UTENSIL REST

BACKGROUND OF THE INVENTION

1. Field of the Invention

The present invention relates generally to an apparatus for supporting a utensil on an open receptacle, such as a food container or a cooking vessel, with one end of the utensil extending over the rim of the vessel.

2. Discussion of Background and Prior Art

A variety of utensil rests are well known in the art.

ATTACHMENT TO THE RECEPTACLE RIM

In Cunningham U.S. Pat. No. 1,305,777, the rest hangs from the rim of the receptacle or cooking vessel and has an integral sloped cradle supporting the spoon at an angle to the horizontal completely outside of the receptacle. This arrangement is a problem because drippings from the spoon fall outside of the receptacle onto the counter, stove, or top on which the receptacle is supported. It is an object of the present invention to support the utensil with the wet end of the utensil extending over the open receptacle.

In Stevens U.S. Pat. No. 1,323,924 and Jurgich U.S. Pat. No. 4,632,347 a rim attached holder holds the working end of the spoon over the open vessel. The problems with these particular arrangements are either that the utensil is held at an angle to the horizontal and has a tendency to slip on the holder and fall into the open vessel, or, that the utensil protrudes from one side of the vessel with the handle protruding from another side of the vessel causing the spoon and holder protrusion to interfere with efficient use of the surrounding work area. It is an object of the present invention to support the rest on the handle of the open receptacle and to support the utensil on the rest in a generally horizontal position.

ATTACHMENT TO THE RECEPTACLE HANDLE

It is also known to support a utensil rest on the handle of the open receptacle. See, Hauf U.S. Pat. No. 1,196,543; Burns U.S. Pat. No. 1,327,982; Smith U.S. Pat. No. 1,464,731; and Scott U.S. Pat. No. 5,105,963. However, none of these references disclose or suggest also supporting the utensil on the handle generally horizontally with the working end extending over the open receptacle.

While the goal of supporting a utensil (including a paint brush) in a holder generally horizontally with the working end of the utensil (brush) extending over the open receptacle has been achieved in the prior art, in each case the holder was some form of tension holding device, such as, the bent wire loops of Avery U.S. Pat. No. 1,183,732 or the U-shaped clip 25 of Scott U.S. Pat. No. 5,105,963. See also, the spring plate member 42 of Buder U.S. Pat. No. 4,991,803. The problem with these types of devices is that they require two hands to safely release the utensil without risk of spillage or overturning the receptacle. It is an object of the present invention to support the utensil on the rest so that it is easily released with the use of one hand.

SUMMARY OF THE INVENTION

Set forth below is a brief summary of the invention in order to achieve the foregoing objects and other benefits and advantages in accordance with the purposes of the present invention as embodied and broadly described herein.

One aspect of the invention is the ornamental design for a utensil rest, as shown and described.

Another aspect of the invention is a utensil rest which includes an upwardly extending cradle or trough, an elongated vertical rib supporting the cradle and having one end taller than the other end, and a spring clip or holder depending from the short end of the rib. The cradle is adapted to receive and support the utensil. The spring clip is adapted to grasp a handle of a receptacle and position the tall end of the rib adjacent the top surface of the handle whereby the utensil may be held generally horizontally with the working end of the utensil extending over a rim of the open receptacle.

Another feature of this aspect of the invention is an upwardly extending ridge transverse the inboard end of the trough adapted to vertically support the inboard end of the utensil sufficiently high to prevent slippage of the utensil toward the vessel.

Another feature of this aspect of the invention is the ratio of the length of the tall dimension of the rib as a numerator and the length of the short dimension of the rib as a denominator being predetermined relative to an angle of the handle to the horizontal such that the trough is adapted to hold the utensil therein generally horizontally.

Another feature of this aspect of the invention is that the vertical height of the tall end of the rib is, in one embodiment, greater than, and, in another embodiment, less than, the sum of the vertical height of the short end of the rib plus the overall vertical height of the spring clip Another feature of this aspect of the invention is the holder further includes a base portion attached to the bottom of the short end of the rib and a pair of spaced, inturned prongs with outturned ends depending from the base portion. The holder has sufficient rigidity to retain its permanent shape and sufficient flexibility to be adapted to resiliently, demountably snap onto and firmly grasp the handle of the vessel without permanent deformation.

Another feature of this aspect of the invention is the prongs each have an inner surface portion a point of which is a fulcrum adapted to abut against the underside of the handle and force the tall end of the rib against a top portion of the handle.

Preferably, the rest is molded integrally of nylon or equivalent thermoplastic resin.

BRIEF DESCRIPTION OF THE DRAWINGS

FIG. 15 is a rear elevational view of FIG. 1 rotated clockwise 180 degrees, and further modified to include a longer stem in the vertical plane. The front view of this embodiment is the same as shown in FIG. 15. The top view of this embodiment is the same as shown in FIG. 2. The bottom view of this embodiment is the same as shown in FIG. 4.

FIG. 16 is a left-side elevation of FIG. 15.

FIG. 17 is a right-side elevation of FIG. 15.

FIG. 18 is a rear elevational view of FIG. 1 rotated clockwise 180 degrees and further modified to show an intermediate height stem. The front view of this embodiment is the same as shown in FIG. 18. The top view of this embodiment is the same as shown in FIG. 2.

FIG. 19 is a left-side elevational view of FIG. 18.

FIG. 20 is a right-side elevational view of FIG. 18.

FIG. 21 is a bottom plan view of FIG. 18.

DETAILED DESCRIPTION OF THE PREFERRED EMBODIMENT

Figure 1:
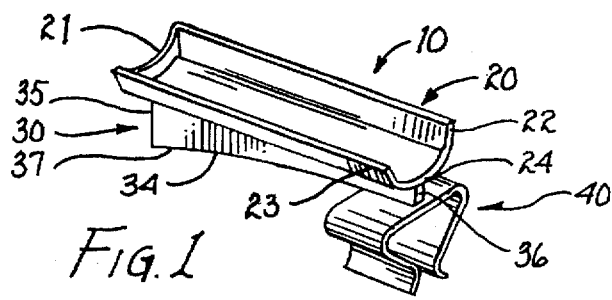
FIG. 1 is a perspective view of a preferred embodiment of the utensil rest of the present invention showing a trough with a raised ridge at its inboard end and supported on an elongated stem which is integral with a depending spring clip fastener.

Shown in FIG. 1 is the utensil rest 10 of the present invention. The rest 10 includes a trough or cradle 20 supported on, or integral with, an elongated stem or rib 30 which is supported on or has integrally attached thereto, a depending spring clip or resilient grasp 40.

Elongated stem 30 functions to connect cradle 20 and spring clip 40 in a manner to permit the cradle to be affixed to the handle 61 of a flat-bottomed 63 receptacle or cooking vessel 60 and to hold the utensil 50 generally horizontal with the inboard working end 51 of the utensil extending over the rim 62 of the vessel. The rib 30 also adds strength to the holder 10. As further described below, spring clip 40 is snapped onto the outboard end of handle 61 (FIG. 22) with the other (distal) end of the rest 10 adjacent rim 62.

Figure 5:
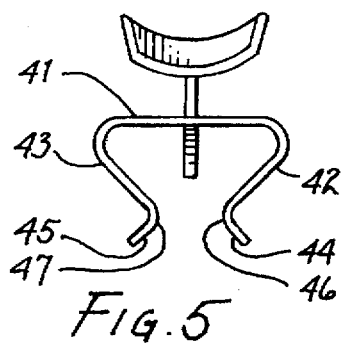
FIG. 5 is a right-side elevational view of FIG. 1.
Figure 13:
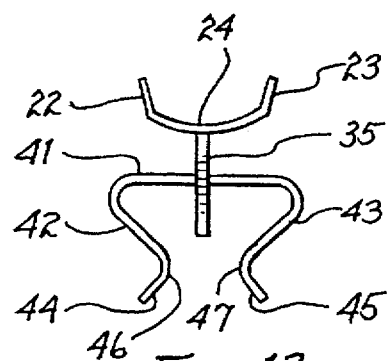
FIG. 13 is a left-side elevational view of FIG. 8.
Figure 9:
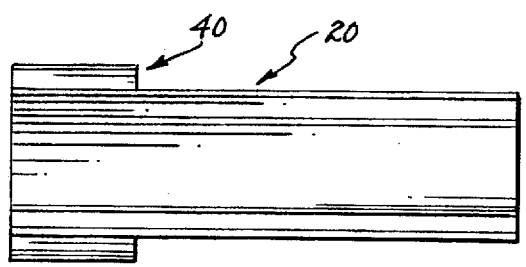
FIG. 9 is a top plan view of FIG. 8 rotated clockwise 180 degrees.
Figure 12:
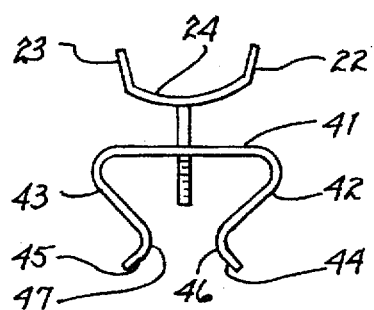
FIG. 12 is a right-side elevational view of FIG. 8.
Figure 10:
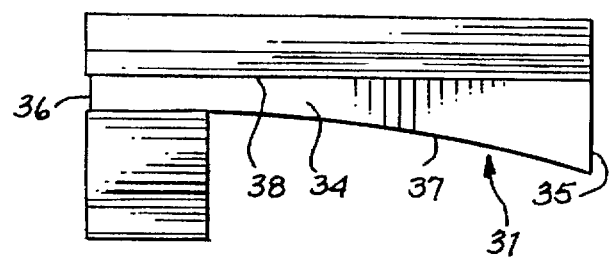
FIG. 10 is a rear elevational view of FIG. 8 rotated clockwise 180 degrees.
Figure 14:
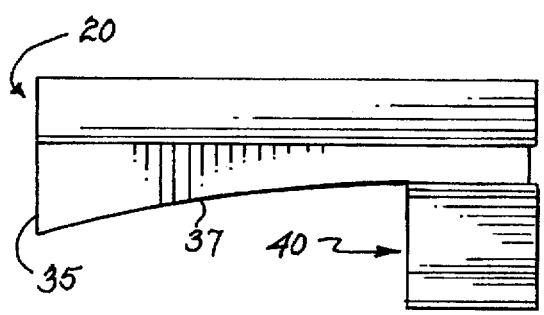
FIG. 14 is a front elevational view of FIG. 8.
Figure 11:
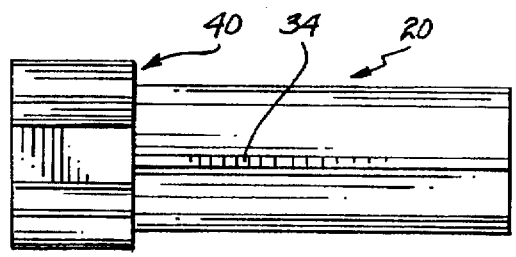
FIG. 11 is a bottom plan view of FIG. 8 rotated clockwise 180 degrees.
Figure 22:
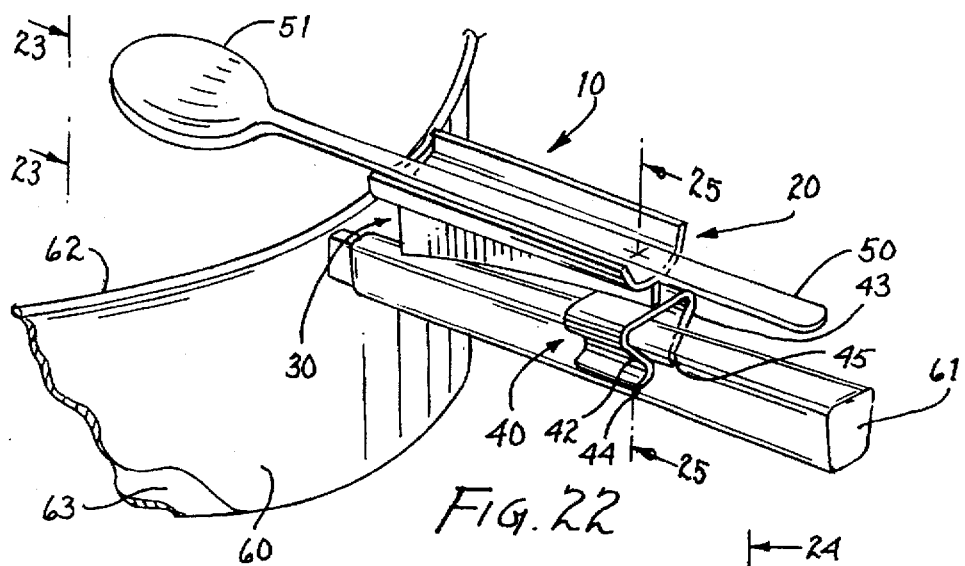
FIG. 22 is a perspective view in partial section of the utensil rest of the present invention as shown in FIG. 1 supporting a utensil on the handle of a cooking vessel.

The trough or cradle 20 has a raised ridge 21 at its inboard end, slightly raised sides 22,23 and a shallow central channel or depression portion 24. As best seen in FIG. 22, cradle 20 supports a utensil 50 readily with the inboard end 51 of the utensil extending over the rim 62 of a cooking vessel 60. Trough 20 has a generally upwardly turned U-shaped configuration. (FIGS. 5,12,13). Utensil 50 is simply laid into the cradle 20 where it rests and is held of its own weight. It is removed with one hand by simply grabbing and lifting it. There is no risk of spillage of any of the contents of container 60.

Figure 3:
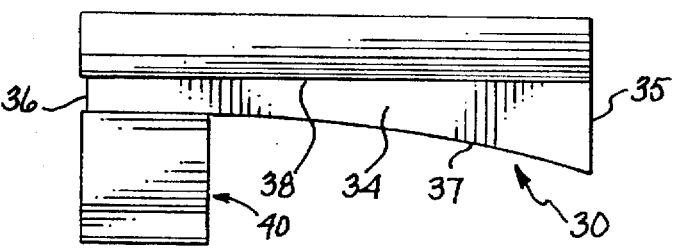
FIG. 3 is a rear elevational view of FIG. 1 rotated clockwise 180 degrees.
Figure 7:
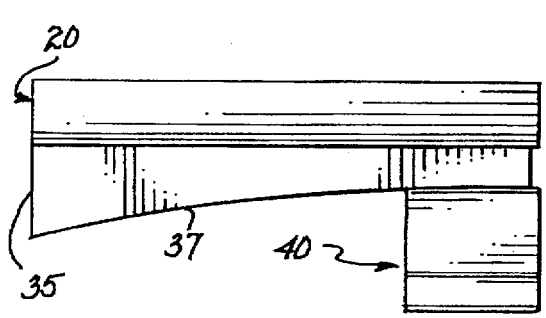
FIG. 7 i a front elevational view of FIG. 1.
Figure 4:
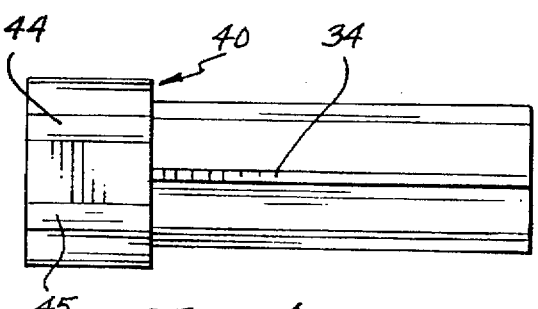
FIG. 4 is a bottom plan view of FIG. 1 rotated clockwise 180 degrees.
Figure 8:
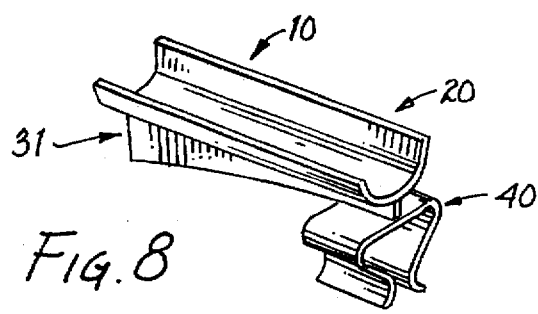
FIG. 8 is a perspective view of a second embodiment of the utensil rest of the present invention showing the trough supported on the elongated rib integral with the depending, resilient grasp.
Figure 24:
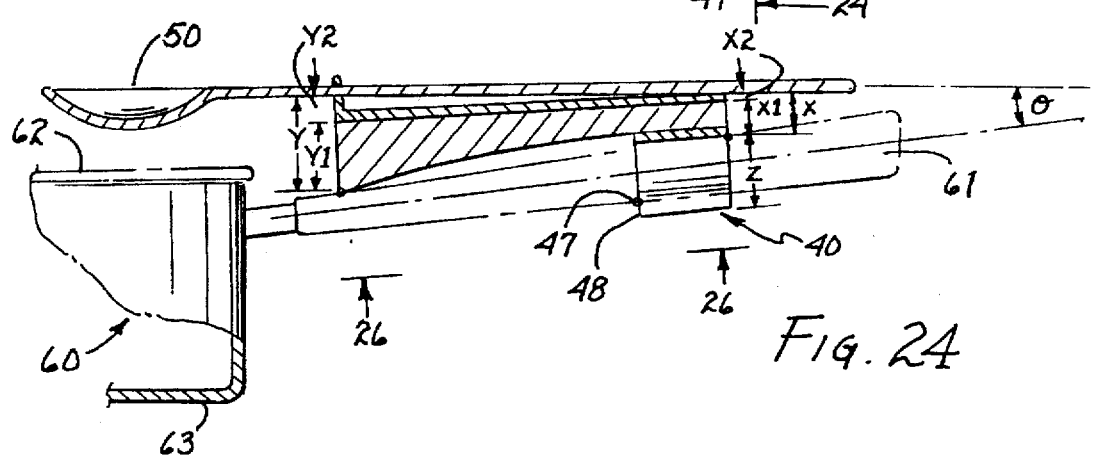
FIG. 24 is a front elevational view in partial sectional view of FIG. 23 taken along the lines 24–24.
Figure 26:
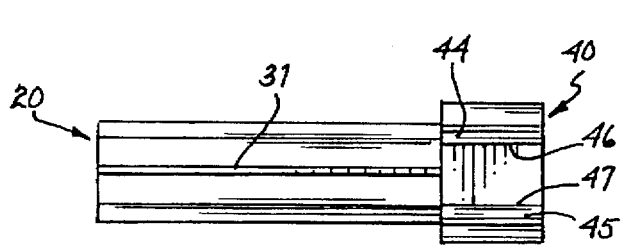
FIG. 26 is a bottom plan view of the utensil rest of FIG. 22.
Figure 25:
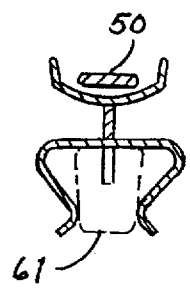
FIG. 25 is a right-side sectional view of FIG. 22 taken along the line 25—25.

As best seen in FIG. 3 elongated rib or stem 30 includes a central riser portion 34, an inboard vertical edge 35, an outboard vertical edge 36, a bottom edge 37 and a top edge 38. The central riser portion 34 supports cradle 20 on top edge 38 which is preferably molded integrally with cradle 20. Edge 37 may be either straight or curved to blend smoothly into the inboard and outboard edges 35,36, respectively. As best seen in FIG. 24 the height X1 of the outboard edge 36 plus the thickness X2 of the cradle wall adjacent the edge 36 identified as length X and the combined height Y1+Y2 of the inboard edge 35 and ridge 21 respectively, identified as length Y are preselected relative to the angle θ (FIG. 24) which the center line of the handle 61 makes with the horizontal so that the utensil is held in a generally horizontal position.

As pointed out below, the material from which utensil rest 10 is made has a slippery characteristic in its final form. By selecting the lengths X,Y respectively relative to the angle θ of the handle 61 of the cooking vessel, the utensil rest 10 of the present invention is thereby configured to hold the utensil generally horizontal, thereby eliminating any tendency of the utensil to slide inwardly into the open cooking vessel 60.

Figure 6:
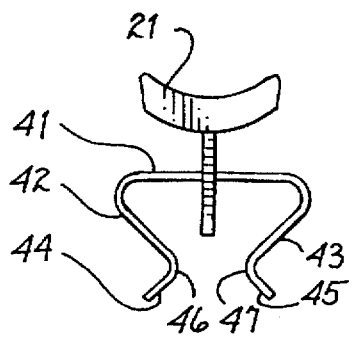
FIG. 6 is a left-side elevational view of FIG. 1.
Figure 2:
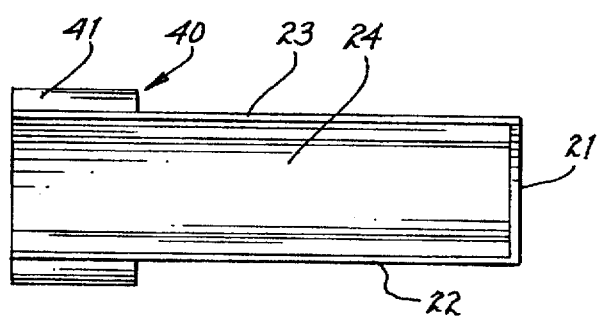
FIG. 2 is a top plan view of FIG. 1 rotated 180 degrees clockwise.
Figure 23:
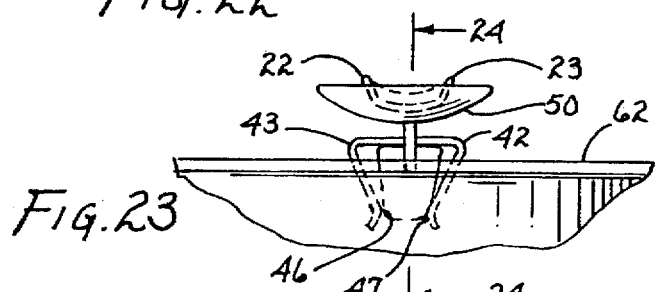
FIG. 23 is a left-side elevational view of FIG. 22 as viewed from the direction 23—23.

As further shown in FIG. 1 spring clip 40 is integral with, or attached to and depends from the outboard end of stem 30 (relative to vessel 60 and handle 61, vessel 60 is at the inboard end of handle 61). Spring clip 40 has a horizontal base portion 41 to which is attached depending inwardly turned prongs 42,43 which have outturned edges 44,45. Spring clip 40 has a generally downwardly turned U-shaped configuration with slightly outturned edges 44,45 at the end of the prongs 42,43 away from the base portion 41. As further described below, the material from which spring clip 40 is made allows a flexing of the depending prongs 42,43 without fracture or permanent deformation. Thus, spring clip 40 is effectively a resilient clamp or grasp or fastener for mounting the rest 10 onto the handle 61. Accordingly, spring clip 40 is readily snapped onto the outboard end of a handle 61 of a receptacle or cooking vessel 60 which has a flat bottom 63 (FIGS. 22,24). The user simply positions utensil holder 10 on top of handle 61 with the top edge of the handle 61 received between the outturned edges 44,45 of spring clip 40 and then pushes downward slightly flexing prongs 42,43 outwardly and then inwardly as handle 61 is received within spring clip 40 and held snugly therein. In this position the bottom of inboard edge 35 of elongated stem 30 rests firmly against the top of handle 61 and a utensil 50, resting in cradle 20 of utensil rest 10, will have its inboard end extending over rim 62 of cooking vessel 60. When utensil rest 10 is in its final position clamped to handle 61, as best seen in FIGS. 23,24 the inherent resilience of spring clip 40 pulling prongs 42,43 inwardly puts pressure on the inboard inside upper surfaces 46,47 (FIGS. 6,23) adjacent the inboard edge 48 (FIG. 24) of resilient clamp 40. This pressure applies a downward force (a counterclockwise moment as seen in FIG. 24) on the inboard end 35 of holder 10 tending to keep the bottom of inboard edge 35 held firmly against the inboard top surface of handle 61.

Utensil 50 may be any utensil commonly used in cooking, such as a spoon, fork, spatula, stirrer, beater and the like. If the center of gravity of the utensil is more toward the working end of the utensil which is used for stirring and tasting the food within the vessel 60 the utensil is positioned sufficiently toward the outboard end of the handle 61 atop of trough 20 so that the center of gravity is within the area of the trough 20 preventing the utensil from falling into cooking vessel 60 while maintaining the working end of the utensil over the open vessel.

The material from which utensil rest 10 is made is preferably nylon or equivalent thermoplastic resin, which has a high inherent resilience without fracture or permanent deformation when molded into finished products. Additionally, nylon has a high enough threshold melting point that it retains its rigidity and flexibility even when the rest is applied to vessels handles which naturally tend to become hot during normal cooking operations, such as, iron handled skillets over open flames and the like. However, other known thermoplastic materials may be used provided they meet the requirements of rigidity when molded, flexibility, and sufficiently high melting point. Nylon also has a slippery characteristic in its final hard form. Despite that characteristic, there is no tendency of the utensil held in the nylon cradle of the present invention to slip inwardly and fall into the open vessel 60 since the Y/X ratio described above retains the utensil in generally horizontal position in the cradle.

FIGS. 8–14 show a second embodiment of the utensil rest 10 of the present invention. This embodiment is similar to the embodiment of FIG. 1 except there is no ridge 21 and the length of inboard edge 35 is slightly shorter than that shown in FIG. 1. Accordingly, in the embodiment of FIGS. 8–14, the utensil rests fully along the shallow channel or depression 24 of trough 20 and is supported thereon without having its inboard end lifted by any ridge 21 as was the case in the FIG. 1 embodiment. Also, with a shorter inboard edge 35 of stem 31, again, the inboard end of utensil 50 will not be lifted up as much as in the FIG. 1 embodiment. Accordingly, the embodiment of FIGS. 8–14 has a smaller Y/X ratio and is better adapted for handles 61 of cooking vessels 60 that are at a shallower angle θ to the horizontal.

FIGS. 15–17 show a further embodiment of the utensil rest 10 of the present invention in which the stem 32 has an inboard vertical edge 35 longer than that of the FIG. 1 embodiment. In this version of the utensil rest 10 of the present invention, the edge 35 of the stem 32 actually is long enough to extend below the bottom edge of the resilient spring clip 40. In this embodiment there is a high Y/X ratio which indicates the suitability of this embodiment for cooking vessels 60 whose handle is at a steeper angle θ to the horizontal. As shown in FIG. 24 the overall vertical height of just the spring clip or holder 40 portion of rest 10 is identified as dimension Z. Thus, the height Y1 of edge 35 of FIG. 15 is greater than the sum (X1+Z) of the vertical height X1 of the short end 36 of the rib 32 plus the overall vertical height Z of the spring clip 40.

FIGS. 18–20 show a still further embodiment of the utensil rest of the present invention which is again similar to the embodiment of FIGS. 1–7 except that the stem 33 has a length of inboard edge 35 which is intermediate that shown in the embodiments of FIGS. 1–7 and FIGS. 15–17. Thus, the embodiment of FIGS. 18–20, like the embodiment of FIGS. 8–14, is adapted for handles 61 which are at a somewhat shallower angle θ to the horizontal than was the case for the embodiment for FIGS. 15–17, for example.

BENEFITS OF THE PRESENT INVENTION

The invention described above is easily snapped onto virtually any receptacle which has an elongated handle and, therefore, has applicability to handled containers used in the preparation of food products. A few variations in the stem height provides a family of utensil rests that fit all such receptacles in today's modern kitchen in homes or restaurants. Because it can be readily molded in large quantities using a thermoplastic resin, the utensil rest of the present invention is inexpensive. The utensil-on-cradle-on-handle-with-predetermined -Y/X- ratio design allows for efficient, clean use of food preparation areas while holding the utensil level with the wet end over the open vessel and preventing the utensil from slipping into or falling off of the rest. The utensil is conveniently located in an open cradle without fear of melting under normal conditions and is easily picked up from the rest for reuse without risk of tipping, spilling, or overturning the vessel 60.

The foregoing description of a preferred embodiment and best mode of the invention known to applicant at the time of filing the application has been presented for the purposes of illustration and description. It is not intended to be exhaustive or to limit the invention to the precise form disclosed, and, obviously, many modifications and variations are possible in light of the above teaching. The preferred embodiment was chosen and described in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

I claim:

1. A rest constructed and configured to hold a utensil generally horizontally with one end of the utensil extending over a rim of an open receptacle, comprising:
    an upwardly extending generally U-shaped trough constructed and configured to receive and support the utensil,
    an elongated vertical rib supporting the trough and having a tall end and a short end and wherein the elongated vertical rib extends centrally and longitudinally substantially along an entire length of a bottom of the trough and supporting the trough thereon, and
    a resilient holder depending from the short end of the rib and constructed and configured to grasp a handle of the receptacle with the tall end of the rib resting on a top surface of the handle.

2. The rest of claim 1 further comprising:
    the trough having a distal end away from the end overlying the resilient holder,
    an upwardly extending ridge transverse the distal end of the trough adapted to vertically support the one end of the utensil sufficiently to prevent slippage of the utensil toward the receptacle.

3. The rest of claim 2 wherein the rest is constructed and configured to attach to the handle of a flat bottomed receptacle in which the handle of the receptacle forms a downward angle relative to a horizontal plane when the bottom of the receptacle is held horizontal and further comprising:
    the ratio of the sum of the length of the tall dimension of the rib plus the thickness of the trough plus the height of the ridge as a numerator to the length of the short dimension of the rib plus the thickness of the trough as a denominator being predetermined relative to the angle such that the trough is constructed and configured to hold the utensil therein generally horizontally.

4. The rest of claim 1 further comprising:
    the ratio of the length of the tall dimension of the rib as a numerator and the length of the short dimension of the rib as a denominator being predetermined relative to an angle of the handle to the horizontal such that the trough is constructed and configured to hold the utensil therein generally horizontally.

5. The rest of claim 1 wherein the trough has upwardly extending sides and a long, narrow central depression constructed and configured to sufficiently cradle the utensil in the trough to prevent its falling off of the trough when resting thereon.

6. The rest of claim 1 wherein the vertical height of the tall end of the rib is greater than the sum of the vertical height of the short end of the rib plus the overall vertical height of the holder.

7. The rest of claim 1 wherein the vertical height of the tall end of the rib is less than the vertical height of the short end of the rib plus the overall vertical height of the holder.

8. The rest of claim 1 wherein the holder further comprises:

a base portion attached to the bottom of the short end of the rib, and a pair of spaced prongs depending from the base portion, the holder having sufficient rigidity to retain its permanent shape and sufficient flexibility to be adapted to resiliently, demountably snap onto and firmly grasp the handle of the receptacle without permanent deformation.

9. The rest of claim 8 wherein the holder is a spring clip wherein the base portion is generally horizontal and the prongs are inwardly turned.

10. The rest of claim 8 wherein each prong has an outwardly turned bottom end adapted for receiving the handle therebetween and guiding it into the holder between the prongs.

11. The rest of claim 8 wherein the tall end of the rib is toward the rim and the prongs each have an inner surface portion, a point of which is a fulcrum constructed and configured to abut against the underside of the handle and force the tall end of the rib against a top portion of the handle.

12. The rest of claim 1 wherein the tall end is toward the rim and the holder has inner surface fulcrum portions constructed and configured to abut against the underside of the handle and force the tall end of the rib against a top portion of the handle.

13. The rest of claim 1 wherein the trough, rib and holder are integral.

14. The rest of claim 1 wherein the trough, rib and holder are made of nylon.

15. The rest of claim 1 wherein the trough has upwardly extending sides and a long, narrow central depression adapted to sufficiently cradle a handle of the utensil in the trough to prevent its falling off of the trough when resting thereon.

16. The rest of claim 1, wherein the U-shaped trough is elongated and has substantially the same width throughout its dimension.

17. A utensil rest comprising an upwardly extending cradle having a bottom portion, an elongated vertical stem centrally, longitudinally extending along the bottom of the cradle and supporting the cradle thereon and having a short end and a tall end, and a spring clip depending from the short end of the stem.

18. A rest constructed and configured to hold a utensil generally horizontally with one end of the utensil extending over a rim of an open receptacle, comprising:

an upwardly extending generally U-shaped trough constructed and configured to receive and support the utensil, an elongated vertical rib supporting the trough and having a tall end and a short end, a resilient holder depending from the short end of the rib and constructed and configured to grasp a handle of the receptacle with the tall end of the rib resting on a top surface of the handle, the trough having a distal end away from the end overlying the resilient holder, an upwardly extending ridge transverse the distal end of the trough adapted to vertically support the one end of the utensil sufficiently to prevent slippage of the utensil toward the receptacle, and the trough having two generally parallel upturned sides and the transverse ridge being a straight member connecting the two sides at the distal end.

* * * * *